US006877878B2

(12) United States Patent
Raskas

(10) Patent No.: US 6,877,878 B2
(45) Date of Patent: Apr. 12, 2005

(54) FLASHLIGHT AND VIDEO RECORDER DEVICE

(76) Inventor: Eric J. Raskas, 541 Mapleview Dr., St. Louis, MO (US) 63130

( * ) Notice: Subject to any disclaimer, the term of this patent is extended or adjusted under 35 U.S.C. 154(b) by 0 days.

(21) Appl. No.: 10/413,327

(22) Filed: Apr. 14, 2003

(65) Prior Publication Data

US 2004/0201989 A1 Oct. 14, 2004

(51) Int. Cl.[7] .............................................. F21V 33/00
(52) U.S. Cl. ........................... 362/253; 362/8; 362/202
(58) Field of Search ................................ 362/8, 11, 13, 362/202, 205, 253

(56) References Cited

U.S. PATENT DOCUMENTS

| | | | | |
|---|---|---|---|---|
| 4,635,123 A | | 1/1987 | Masunaga et al. ........... | 358/213 |
| 4,676,619 A | * | 6/1987 | Woolley ...................... | 396/432 |
| 4,989,093 A | * | 1/1991 | Kaneko .................... | 348/224.1 |
| 5,305,033 A | | 4/1994 | Takahashi et al. ............ | 354/76 |
| 5,446,599 A | * | 8/1995 | Lemelson .................... | 386/118 |
| 5,520,544 A | * | 5/1996 | Manico et al. ............... | 434/317 |
| 5,793,419 A | | 8/1998 | Fraley ......................... | 348/143 |
| 5,931,562 A | | 8/1999 | Arato ........................ | 362/184 |
| 6,022,117 A | * | 2/2000 | Tenmyo et al. ............... | 362/17 |
| 6,078,752 A | * | 6/2000 | Tenmyo ...................... | 396/176 |
| 6,286,973 B1 | | 9/2001 | Thrower ...................... | 362/86 |
| 6,439,432 B1 | | 8/2002 | Park ........................... | 222/113 |
| 6,443,587 B2 | | 9/2002 | Thrower ...................... | 362/86 |
| 6,488,390 B1 | * | 12/2002 | Lebens et al. ............... | 362/231 |
| 6,510,338 B1 | * | 1/2003 | Irion et al. ................... | 600/476 |
| 2002/0006037 A1 | | 1/2002 | Thrower | |
| 2003/0002274 A1 | | 1/2003 | Thrower | |

FOREIGN PATENT DOCUMENTS

| | | |
|---|---|---|
| EP | 0593836 A1 | 10/1992 |
| FR | 24 18539 A | 9/1979 |
| FR | 2458138 A1 | 10/1980 |
| FR | 2667396 | 9/1990 |
| JP | 63-276838 | 5/1987 |
| JP | 01-294317 | 5/1988 |
| JP | 08-125487 A | 5/1996 |
| WO | WO 99/46624 A1 | 9/1999 |

OTHER PUBLICATIONS

Bhedwar, Homi C. et al. "Ceramic Multilayer Package Fabrication", Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–1B–827.

Kim, Joonwon et al. "A Micromechanical Switch with Electrostatically Driven Liquid–Metal Droplet." Sensors and Actuators, A: Physical. v 9798, Apr. 1, 2002, 4 pages.

* cited by examiner

Primary Examiner—John Anthony Ward
(74) Attorney, Agent, or Firm—Polster, Lieder, Woodruff & Lucchesi, L.C.

(57) ABSTRACT

A flashlight and video recorder device is disclosed which comprises an illumination portion for producing a beam of light, a video recorder for recording video images, a casing for housing the illumination portion and the video recorder, and a lens guide for preventing light from the illumination portion from affecting any of the video images.

20 Claims, 5 Drawing Sheets

FLASHLIGHT AND VIDEO RECORDER DEVICE

BACKGROUND OF THE INVENTION

This invention relates to a flashlight and video recorder device, and more particularly, to a flashlight and video recorder device for recording video images for storage and playback.

Flashlights are useful devices employed by various professions, such as police, firemen, military, and even maintenance workers. Even though flashlights have been proven to be useful devices there are some applications where flashlights combined with a device to record an image would make the flashlight even more useful. For example, a police officer while investigating a location at night may need to illuminate the location and record an incident for later playback and evidence. A fireman may be investigating a fire in the dark and being able to both illuminate the area being investigated and record the area would be helpful for later playback and use in documenting a fire. Further, a maintenance worker may need to go into a dark area to attempt a repair on some equipment. It would then be useful to have a device that can both illuminate a dark area and be able to record the area and the equipment. If the maintenance worker was unable to repair the equipment, the worker could then be able to show the recording to a more qualified technician for advice on how to repair the equipment. It would also be advantageous to record certain situations, such as accidents. If an accident occurred at night, it would be beneficial to record the accident scene and other information such as license plate numbers and insurance information.

Flashlights combined with cameras have previously been proposed. However, such devices require that the light from the flashlight be turned off during the time a picture is being taken in order to reduce wash out of the picture. Further, if the illumination bulb of the flashlight is left on during the taking of a picture or photograph the light reduces the quality of the picture due to wash out of the picture.

The present invention is designed to obviate and overcome many of the disadvantages and shortcomings associated with previously known flashlights combined with cameras. In particular, the present invention is a flashlight and video recorder device that eliminates wash out of a picture or a video recording. Moreover, the device of the present invention can be easily employed to illuminate an area and obtain a video recording of an area without any degradation of the quality of the video recording.

SUMMARY OF THE INVENTION

In one form of the present invention, a flashlight and video recorder device comprises an illumination portion for producing a beam of light, a video recorder for recording video images, a casing for housing the illumination portion and the video recorder, and a lens guide for preventing light from the illumination portion from affecting any of the video images.

In another form of the present invention, a flashlight and video recorder device comprises an illumination portion for producing a beam of light, a video recorder for recording video images, an audio recorder for recording audio signals, a casing for housing the illuminations portion, the video recorder, and the audio recorder, and a lens shield for preventing light from the illumination portion from affecting any of the video images.

In yet another form of the present invention, a flashlight and video recorder device comprises an illumination portion having an illumination device for producing a beam of light, a video recorder for recording video images, a diffuser element for inhibiting the beam of light from interfering with the recording of video images, and a casing for housing the illumination portion, the video recorder, and the diffuser element.

In light of the foregoing comments, it will be recognized that a principal object of the present invention is to provide a flashlight and video recorder device which is of simple construction and design and which can be easily employed with highly reliable results.

An object of the present invention is to provide a flashlight and video recorder device that uses a lens guide or shield to prevent or eliminate washout of a recorded image during recording.

Another object of the present invention is to provide a flashlight and video recorder device that is relatively lightweight and can be used as a conventional flashlight.

A further object of the present invention is to provide a flashlight and video recorder device that can be used as a conventional video recorder.

Another object of the present invention is to provide a flashlight and video recorder device that is constructed to withstand abuse and is durable.

A still further object of the present invention is to provide a flashlight and video recorder device that does not require the light from the flashlight to be turned off when a video image is being recorded.

A further object of the present invention is to provide a flashlight and video recorder device that reduces or eliminates washout of a video image.

Another object of the present invention is to provide a flashlight and video recorder device that uses a diffuser to prevent or eliminate washout of a recorded image during recording.

Another object of the present invention is to provide a flashlight and video recorder device that employs a removable memory card or device for storing recorded images, scenes, or events.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
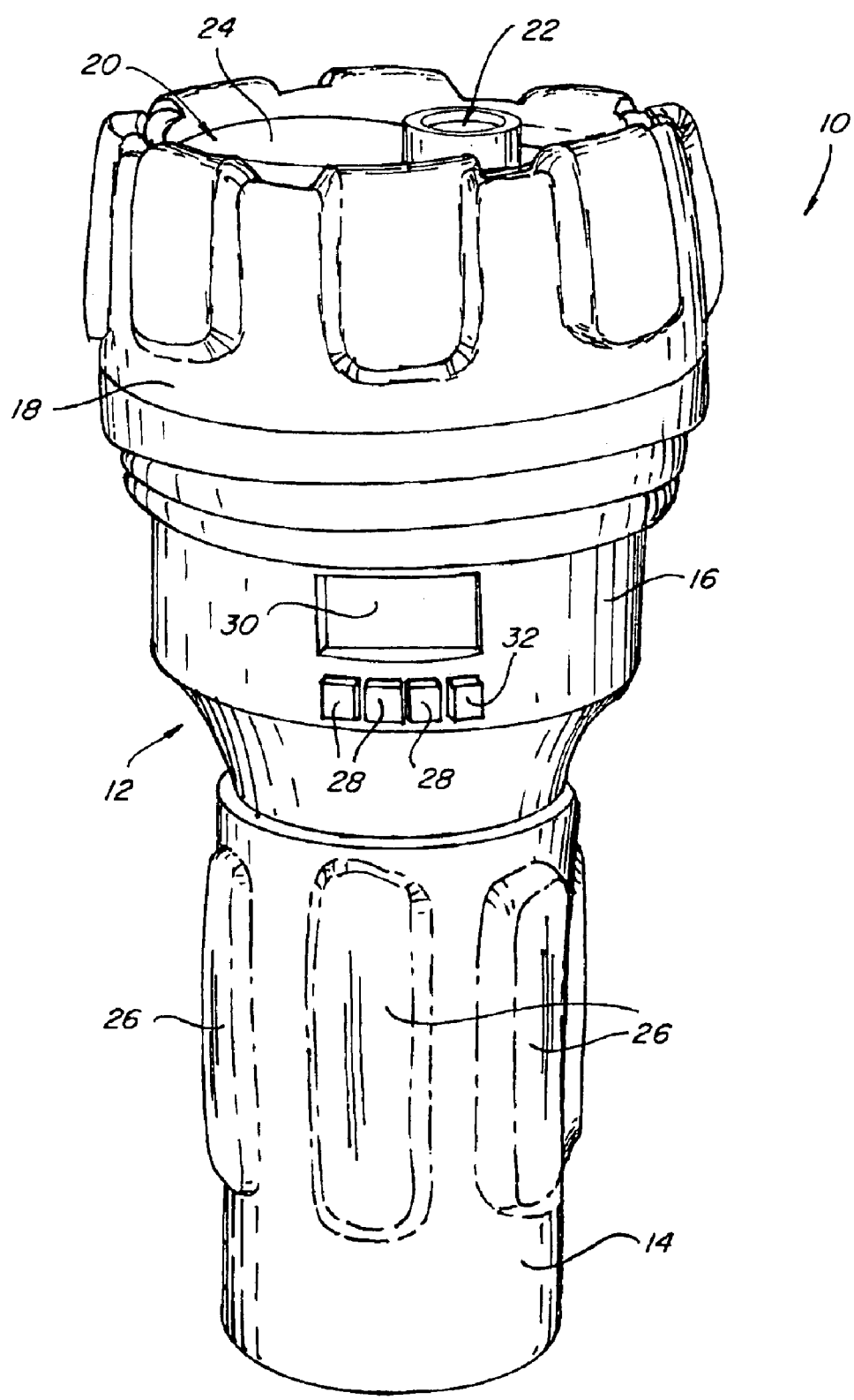
FIG. 1 is a perspective view of a preferred embodiment of a flashlight and video recorder device constructed according to the present invention.

Referring now to the drawings, wherein like numbers refer to like items, number 10 identifies a preferred embodiment of a flashlight and video recorder device constructed according to the present invention. With reference now to FIG. 1, the device 10 is shown comprising a main housing 12 having a power storage portion 14, an intermediate or electronics portion 16, and an illumination portion 18. The portions 14, 16, and 18 form or resemble a flashlight type device with the main housing 12, and in particular portion 14, being capable of being grasped by a hand of a user. The power storage portion 14 is also designed to hold and store a power supply for the device 10, as will be explained more fully herein. The intermediate portion 16 is designed to hold and store electronics for the device 10. The illumination portion 18 is used to house an illumination device or a light portion 20 and a video recorder lens guide or shield 22 of the device 10. The illumination portion 18 also has a transparent glass or plastic lens or plate 24 that is used to cover the illumination device 20. The lens 24 is held in place within the illumination portion 18.

The portions 14, 16, and 18 may be formed or constructed of any suitable plastic or rubber material. The power storage portion 14 may also have grips 26 that aid in handling the device 10. The intermediate portion 16 has a keypad, control buttons, or switches 28, a viewfinder screen 30, and an output port 32. Although not shown, the illumination portion 18 may include grips that aid in handling or grasping the device 10. The portions 14, 16, and 18 may be connected to each other by use of screw threads, frictional engagement, or other suitable fastening, securing, or holding means. It is also possible and contemplated that the portions 14, 16, and 18 are held together in a watertight arrangement for the device to be employed in water or wet environments.

Figure 2:
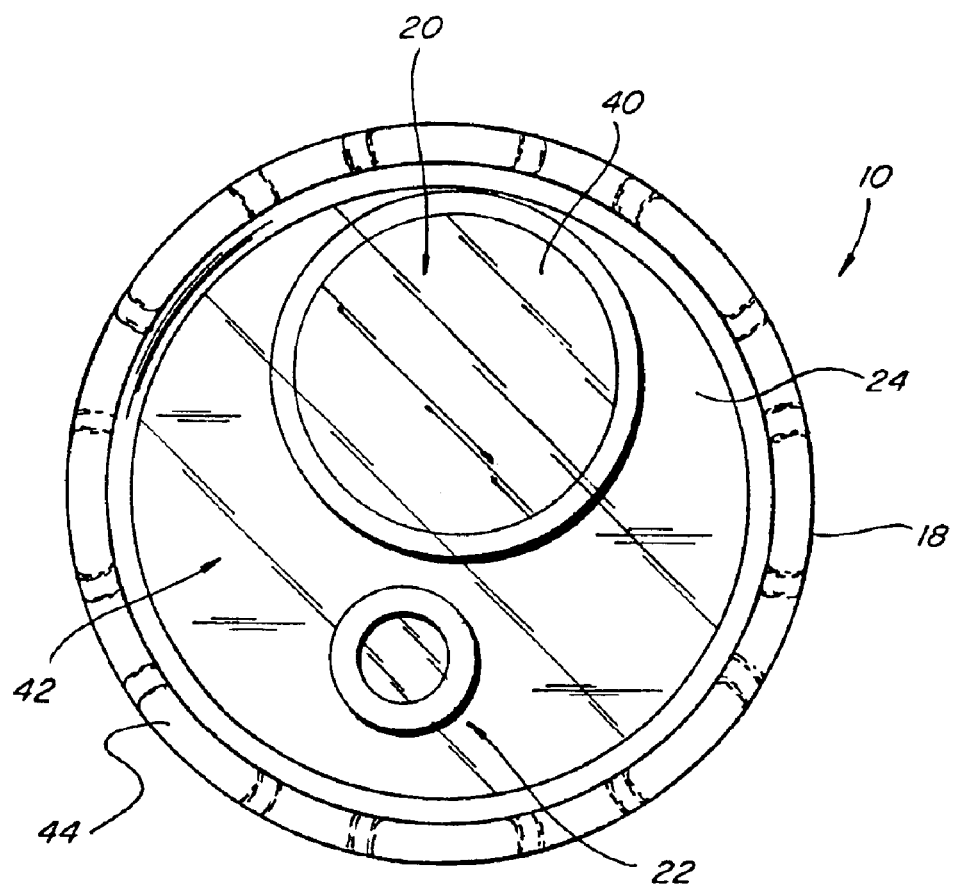
FIG. 2 is an enlarged top view of the flashlight and video recorder device constructed according to the present invention.

FIG. 2 is an enlarged top view of the flashlight and video recorder device 10. In particular, the illumination device 20 of the illumination portion 18 is shown having an illumination light source 40, such as a light bulb or an array of light emitting diodes. The illumination portion 18 also has a reflecting mirror portion 42 that is used to focus and direct a beam of light from the light portion 20 out of the device 10. The light portion 20 is shown being off centered within the illumination portion 18. However, it is also possible to have the light portion centered within the illumination portion 18. The illumination portion 18 may also have an annular flange 44 that is used to hold or retain the lens 24 in place. The video recorder lens guide 22 is illustrated extending out of the illumination portion 18 and the plate 24. However, it is also possible to have the lens guide 22 within the illumination portion 18 and in close proximity to the plate 24 or even abutting the plate 24. The lens guide 22 is tubular in shape and extends from the plate 24 to an aperture (not shown) formed in the mirror portion 42. In this manner, the lens guide 22 is capable of shielding light from the illumination portion 18. Further, although the lens guide 22 is shown being circular in shape or cross section, it is also possible to have a rectangular shape, a triangular shape, or an oval shape. The shape of the lens guide 22 may be determined based upon the shape of an aperture formed in the mirror portion 42.

The plate 24 may include a diffuser element, such as a fresnel lens or a frenel lens, to allow for clear images or pictures to be collected by the device 10. The diffuser element may also be enabled or disabled by operation of one or more of the mode switches 28. In this manner, if the diffuser element is enabled then light is diffused and if the element is disabled then the full power of light portion 20 is expressed. Other examples of a diffuser element that may be employed in the device 10 are tissue paper, a prismatic lens, a low-glare clear lens, or a parabolic lens. Use of a diffuser element may reduce the efficiency of the light projected from the illumination portion 18, while at the same time reducing any washout of a picture or image.

Figure 3:
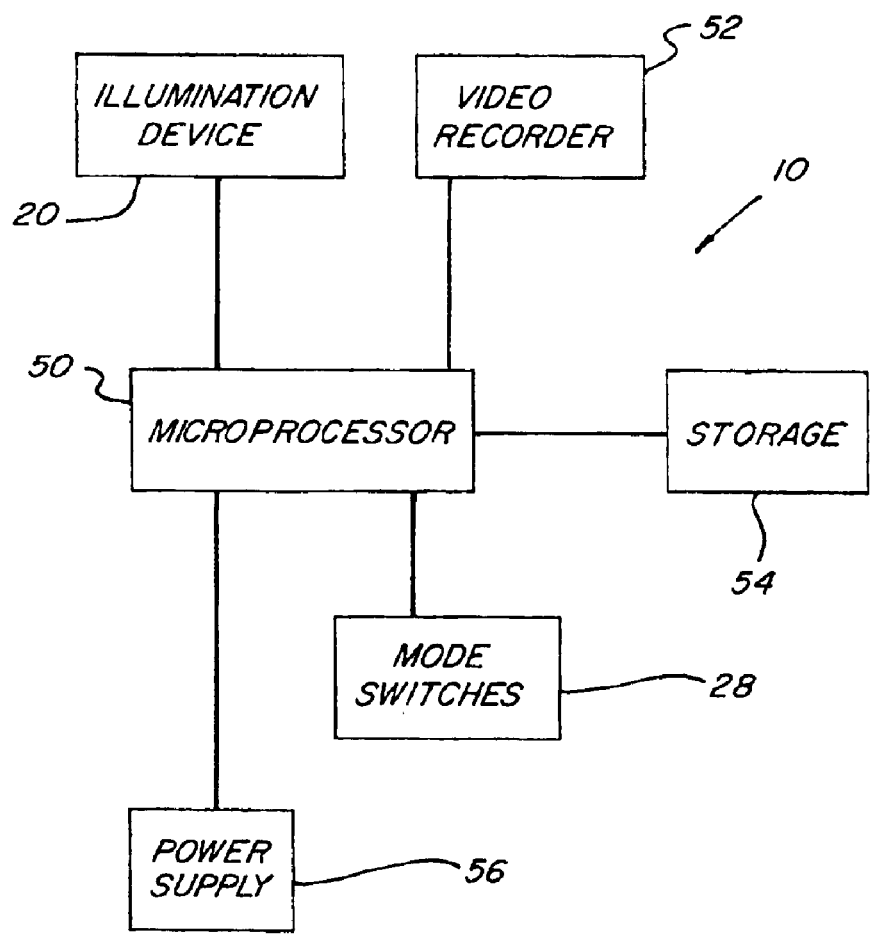
FIG. 3 is a functional block diagram of the flashlight and video recorder device shown in FIG. 1.

With reference now to FIG. 3, a functional block diagram of the device 10 is shown. The device 10 has a microprocessor or microcontroller 50 that has connected to it the illumination device 20, the mode switches 28, a video recorder 52, storage or memory 54, and a power supply 56. The mode switches 28 may be used to control various operations or modes of the device 10. For example, the mode switches 28 may be used to turn on and off the illumination device 20, operate the video recorder 52, turn the device 10 on or off, or operate the screen 30. Although not shown, the microprocessor 50 may be connected to the screen 30 and the output port 32. The viewfinder screen 30 may be a liquid crystal display type device. The power supply 56 may consist of one or more batteries. The batteries may be rechargeable and may also consist of different size batteries and batteries having different voltages. The device 10 may also have provisions for recharging the power supply 56, such as the device 10 being capable of being placed in a recharging cradle or being directly connected to an outlet in a vehicle or a wall. The storage 54 may consist of volatile and nonvolatile memory and removable memory devices or modules, as will be explained further herein.

In operation, a user of the device 10 may select one of the mode switches 28 to turn on the illumination device 20. A user may also operate the mode switches 28 to begin recording an event, a recording, or a sequence of images by the video recorder 52. An event will be stored in the storage or memory 54 and an event may also be deleted by use of the mode switches 28. Playback of a stored event may be accomplished by use of the mode switches 28 and viewing the display 30. After use of the device 10, one of the mode switches may be used to turn off the video recorder 52, or the illumination device 20, or both.

Figure 4:
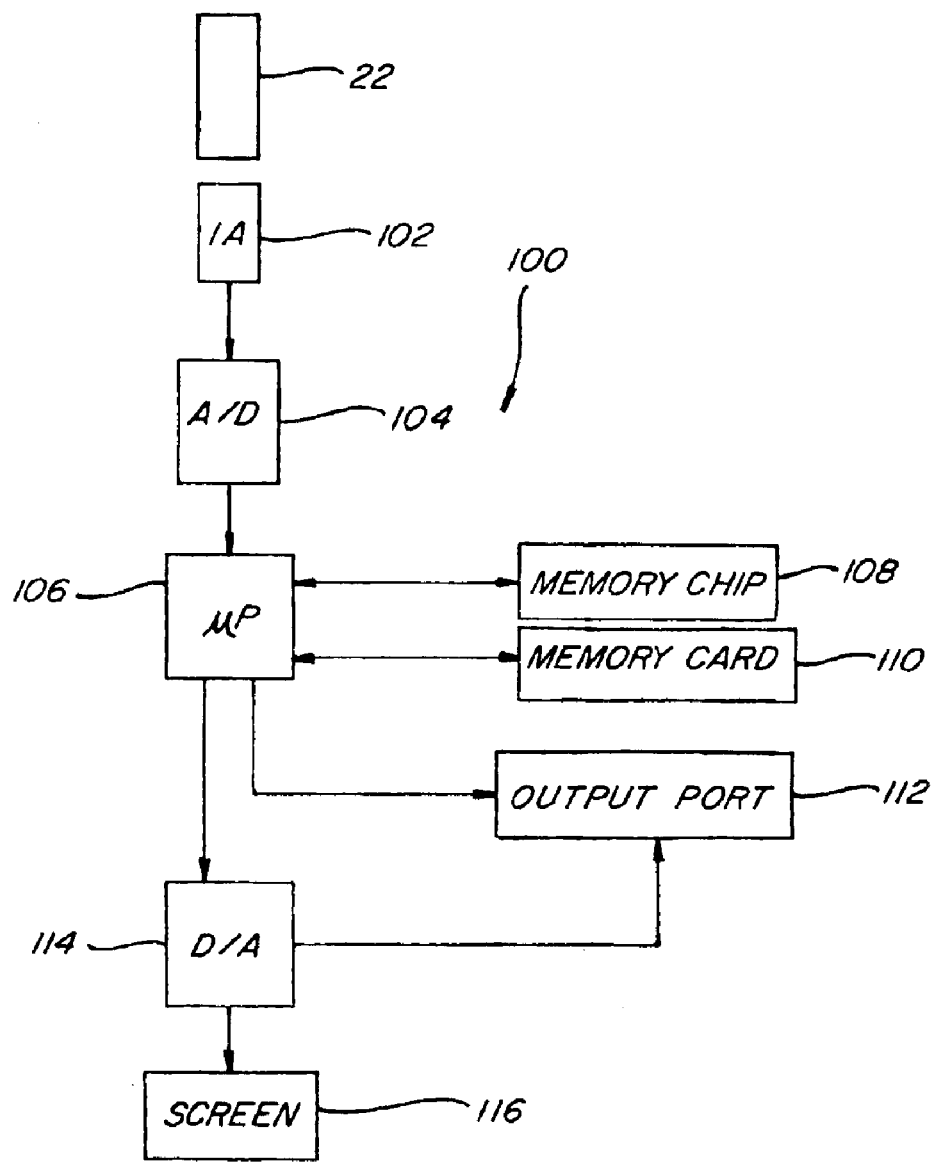
FIG. 4 is a block diagram of the video recorder of the flashlight and video recorder device shown in FIG. 1.

FIG. 4 depicts a block diagram of a video recorder 100 of the flashlight and video recorder device 10 of the present invention. The video recorder 100 has an image array 102 which is used to capture images for recording. The image array 102 may be a semiconductor image sensor or a charged-coupled device that consists of light sensitive devices or cells that produce electrical signals that vary dependent upon the amount of light that hits the devices or cells. The image array 102 receives light that is directed by the lens guide or shield 22. It this manner, light from the illumination device 20 is prevented or shielded from impacting or picked up by the image array 102. The lens guide 22 reduces or eliminates wash out of an image from the light from the illumination device 20.

Electrical signals produced by the image array 102 are sent to an analog to digital converter device (A/D) 104. The A/D 104 is used to read the image information or signals from the image array 102 and converts this information into digital form or signals. The digital signals from the A/D 104 are sent to a microprocessor 106. The microprocessor 106 may be the same microprocessor 50 shown in FIG. 3. The microprocessor 106 sends the digitized images to a memory chip 108 for temporary storage of the digitized images or video. The microprocessor 106 also sends the digitized images to a removable storage or memory device 110. The device 110 may be a flash memory card or any other known memory device that is a removable electronic card that is capable of holding and storing images or video for long term storage. The memory device 110 may be removed from the device 10 and inserted into another electronic device, such as a computer or a PDA for replay or playback of a record event or scene. The microprocessor 106 is also capable of outputting the digital video images via an output port 112. The output port 112 may be any suitable output port, such as an USB port, which is capable of being connected to a computer or other electronic device for transferring video or viewing video.

The video recorder may also include a digital to analog converter (D/A) 114 that is connected to the microprocessor 106. The D/A 114 reconverts digitized images into analog form. The D/A 114 is connected to a viewfinder screen 116 for viewing playback of recorded images or for viewing real-time recording of images or an event. The D/A 114 may also be connected to the output port 112 for outputting analog images.

Although not illustrated in FIG. 4, the mode switches 28 may be connected to the video recorder 100 to control operation of the recorder 100. Various other components and connections to the microprocessor 106 are possible, such as a clock crystal or other timing devices or clock circuitry for developing or producing time signals for the microprocessor 106. For reasons of clarity, chip pins and other chip notations associated with the microprocessor 106 have been omitted.

As can be appreciated, the microprocessor 106 operates in accordance with a main program stored in program memory in the microprocessor 106 or in a separate memory chip, such as the memory chip 108. The microprocessor 106 is programmed to respond to actuation of the mode switches 28. In order to operate the device 10, a user operates the various mode switches 28 in various predetermined sequences. The display 30 or 116 may be viewed while the mode switches 28 are being pressed to visually verify that the proper or desired sequence has been entered. For example, there may be one of the mode switches 28 that is used to start the recording of a sequence or an event. This particular mode switch 28 is selected to begin the recording process. Other mode switches 28 may be used to stop recording, to start playback, to delete a recording, or to save a recording. It is also possible that one of the mode switches 28 may be used to scroll through different menus or modes of operation of the device 10 to reduce the total number of switches 28 actually required to operate the device 10. The device 10 is employed to store streams of video images in the memory 108 or 110. The memory 108 or 110 may be rewritten and other video images stored therein. When a user of the device 10 determines that a particular file or sequence of video needs to be saved, the memory 108 or 110 is used and the saved file may be ported to a computer or an PDA for further storage or use.

Figure 5:
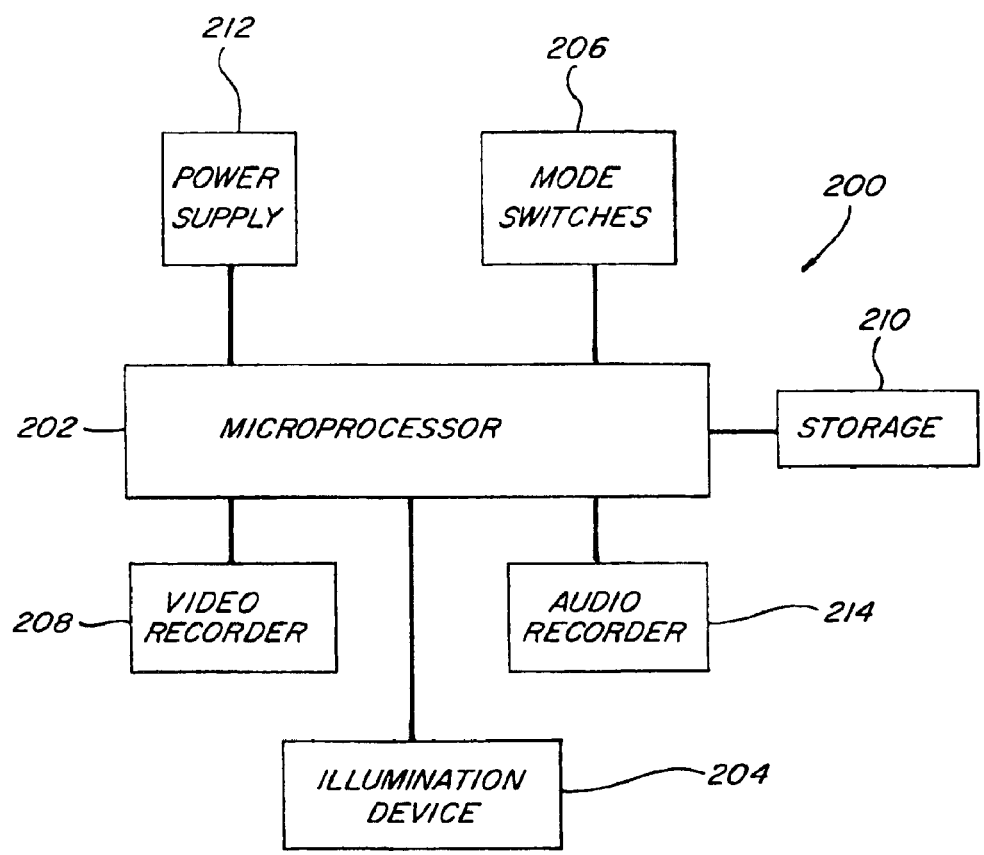
FIG. 5 is a functional block diagram of another preferred embodiment of a flashlight and video recorder device constructed according to the present invention.

FIG. 5 illustrates a functional block diagram of another preferred embodiment of a flashlight and video recorder device 200 constructed according to the present invention. The device 200 comprises a microprocessor or microcontroller 202 that has connected to it an illumination device 204, mode switches 206, a video recorder 208, storage or memory 210, a power supply 212, and an audio recorder 214. One difference between the device 10 and the flashlight and video recorder device 200 is the inclusion of the audio recorder 214. In particular, the audio recorder 214 is used to record sound to be associated with the recording of video images by the video recorder 208. The audio recorder 214 may comprise a microphone, such as a piezoelectric device or other suitable sound recording device that is capable of generating sound signals which sends the signals to other circuitry such as an input amplifier and filter circuit.

The mode switches 206 may be used to control various operations or modes of the device 200. For example and as previously indicated, the mode switches 206 may be used to turn on and off the illumination device 204, operate the video recorder 208, turn the device 200 on or off, or operate the audio recorder 214. Although not shown, the device 200 may also included a viewfinder screen such as the screen 30 or 116 and an output port such as the output port 32. The power supply 212 may consist of one or more batteries. The batteries may be rechargeable and may also consist of different size batteries and batteries having different voltages. The storage or memory 210 may consist of volatile and nonvolatile memory and removable memory devices or modules. The video recorder 208 may be comprised of the components discussed in association with the video recorder 100.

It is also possible that the devices 10 or 200 may include the capability of storing or grabbing a particular frame from the video images. In this particular manner, the devices 10 or 200 operate in a camera mode being capable of taking pictures or snapshots. The displays 30 or 116 may be used to view which frame needs to be recorded or saved.

As can be appreciated from the above discussion, the devices 10 or 200 may be used in dark or low light environments to light up a space at the same time as taking or producing a video of an event. The lens guide or shield 22 prevents light from the illumination devices 22 or 204 from impacting or affecting the quality of the images being recorded by the devices 10 or 200. The device 200 may also be employed to record sound or a message of what is being filmed or videoed. The video images or sequences recorded by the devices 10 or 200 may be played back, stored, or downloaded for permanent storage.

From all that has been said, it will be clear that there has thus been shown and described herein a flashlight and video recorder device which fulfills the various objects and advantages sought therefor. It will become apparent to those skilled in the art, however, that many changes, modifications, variations, and other uses and applications of the subject flashlight and video recorder device are possible and contemplated. All changes, modifications, variations, and other uses and applications which do not depart from the spirit and scope of the invention are deemed to be covered by the invention, which is limited only by the claims which follow.

What is claimed is:

1. A flashlight and video recorder device comprising:
   an illumination portion for producing a beam of light;
   a video recorder for recording video images;
   a casing for housing the illumination portion and the video recorder; and
   a lens guide for preventing light from the illumination portion from affecting any of the video images wherein the illumination portion further comprises a lens cover for covering the illumination portion and the video recorder and the lens guide extends within the illumination portion from the lens cover to the video recorder.

2. The flashlight and video recorder device of claim 1 wherein the lens guide is a tube.

3. The flashlight and video recorder device of claim 1 further comprising a memory for storing video images recorded by the video recorder.

4. The flashlight and video recorder device of claim 1 wherein the lens guide extends through the lens cover and out of the lens cover.

5. The flashlight and video recorder device of claim 1 wherein the lens guide extends within the illumination portion from the video recorder and abuts the lens cover.

6. The flashlight and video recorder device of claim 1 further comprising mode switches for operating the illumination portion and the video recorder.

7. The flashlight and video recorder device of claim 1 further comprising a viewfinder display.

8. A flashlight and video recorder device comprising:
   an illumination portion for providing a beam of light;
   a video recorder for recording video images;
   an audio recorder for recording audio signals;
   a casing for housing the illumination portion, the video recorder, and the audio recorder; and
   a lens shield for preventing light from the illumination portion from affecting any of the video images wherein the illumination portion further comprises a lens cover for covering the illumination portion and the video recorder and the lens shield extends within the illumination portion from the lens cover to the video recorder.

9. The flashlight and video recorder device of claim 8 further comprising a memory for storing video images recorded by the video recorder and audio signals recorded by the audio recorder.

10. The flashlight and video recorder device of claim 8 wherein the lens shield extends through the lens cover and out of the lens cover.

11. The flashlight and video recorder device of claim 8 wherein the lens shield extends within the illumination portion from the video recorder and abuts the lens cover.

12. The flashlight and video recorder device of claim 8 wherein the lens shield is tubular in shape.

13. The flashlight and video recorder device of claim 8 further comprising mode switches for operating the illumination portion, the video recorder, and the audio recorder.

14. The flashlight and video recorder device of claim 8 further comprising a viewfinder display.

15. A flashlight and video recorder device comprising:
   an illumination portion having an illumination device for producing a beam of light;
   a video recorder for recording video images;
   a diffuser element for inhibiting the beam of light from interfering with the recording of video images the diffuser element for covering the illumination portion; and
   a casing for housing the illumination portion, the video recorder, and the diffuser element.

16. The flashlight and video recorder device of claim 15 wherein the diffuser element is capable of being enabled or disabled.

17. The flashlight and video recorder device of claim 16 wherein the diffuser element is a fresnel lens.

18. The flashlight and video recorder device of claim 15 further comprising mode switches for operating the illumination portion, the video recorder, and the diffuser element.

19. The flashlight and video recorder device of claim 15 wherein the diffuser element is tissue paper.

20. The flashlight and video recorder device of claim 15 further comprising a viewfinder display.

* * * * *

UNITED STATES PATENT AND TRADEMARK OFFICE
CERTIFICATE OF CORRECTION

PATENT NO.        : 6,877,878 B2  
APPLICATION NO. : 10/413327  
DATED             : April 12, 2005  
INVENTOR(S)      : Eric J. Raskas Page 1 of 1

It is certified that error appears in the above-identified patent and that said Letters Patent is hereby corrected as shown below:

Col. 8, Line 12  
  After "images" insert a comma

Signed and Sealed this

Second Day of October, 2007

JON W. DUDAS  
*Director of the United States Patent and Trademark Office*